Patented June 13, 1950

2,511,193

UNITED STATES PATENT OFFICE 2,511,193

PROCESS FOR THE PRODUCTION OF DITERTIARY BUTYL HYDROQUINONE

Frederic R. Bean and Thomas S. Donovan, Rochester, N. Y., assignors to Eastman Kodak Company, Rochester, N. Y., a corporation of New Jersey No Drawing. Application February 27, 1947,
Serial No. 731,418

3 Claims. (Cl. 260—625)

This invention relates to a process for the production of ditertiary butyl hydroquinone.

It has been proposed previously to produce alkyl substituted hydroxybenzenes by the process of reacting together a phenolic compound with an alcohol in the presence of zinc chloride. Thus, for example, alkyl monohydroxybenzenes have been prepared by the above process from phenol, cresol; alkyl dihydroxybenzenes from resorcinol, catechol, hydroquinone; alkyl trihydroxybenzenes from pyrogallol, etc. However, the condensations of hydroquinone with tertiary butyl alcohol have always resulted in the production of only monotertiary butyl hydroquinone, and none of the ditertiary butyl derivative.

We have now found that under certain specific conditions, the reaction of hydroquinone with tertiary butyl alcohol, in the presence of zinc chloride, gives the ditertiary derivative, 2,5-ditertiary butyl hydroquinone. We have found that the ratio of zinc chloride to hydroquinone employed in the reaction is critical, and further that it is necessary to use completely anhydrous reagents. For example, a ratio of from less than 0.5 mole to 1.70 moles of zinc chloride per mole of hydroquinone gives only the monotertiary butyl derivative of hydroquinone and none of the ditertiary butyl derivative, whereas by increasing the ratio of zinc chloride to 1.75 moles of zinc chloride per mole of hydroquinone, there is obtained about 35 per cent of the calculated theoretical of 2,5-ditertiary butyl hydroquinone, and with a ratio of 2.0 moles of zinc chloride per mole of hydroquinone from 85-90 per cent of the calculated theoretical of 2,5-ditertiary butyl hydroquinone. Similar high yields of 2,5-ditertiary butyl hydroquinone can be obtained with a ratio as high as 5 moles of zinc chloride per mole of hydroquinone. But where the zinc chloride contains a few per cent of moisture, as might be absorbed by exposure to the atmosphere, none of the ditertiary butyl derivative will be formed in the reaction containing moist zinc chloride, even though the ratio of zinc chloride to hydroquinone exceeds the critical minimum requirement of 1.75 moles of zinc chloride per mole of hydroquinone. While it is advantageous to employ in our process about 2.0 moles of zinc chloride per mole of hydroquinone, it is also possible to increase this ratio to 3 moles of zinc chloride, and with a larger excess of tertiary butyl alcohol present, to even 5 moles of zinc chloride to each mole of hydroquinone and still obtain similar high yields of 2,5-ditertiary butyl hydroquinone. The amount of tertiary butyl alcohol can be varied in the reaction quite widely, from less than equivalent of that required to react with the hydroquinone to more than the required equivalent, the product in each case being the ditertiary butyl derivative of hydroquinone, with little if any, of the monotertiary butyl derivative formed, providing the ratio of zinc chloride to hydroquinone in each case is equal to 1.75 or greater. Our process can be performed advantageously with tertiary butyl alcohol content in the reaction mixture sufficient to dissolve the zinc chloride and hydroquinone.

It is, accordingly, an object of our invention to provide a process for the production of 2,5-ditertiary butyl hydroquinone. Other objects will become apparent hereinafter.

The following examples will serve to illustrate further the process of our invention.

*Example 1.—2,5-Ditertiary butyl hydroquinone* —11 grams (0.1 mole) of hydroquinone crystals were dissolved in 36 grams (0.5 mole) of tertiary butyl alcohol and 28 grams (0.2 mole) of anhydrous zinc chloride were added. The zinc chloride dissolved completely in a few minutes. The reaction mixture was stirred to a uniform solution and heated for one hour in a steam bath, and then slowly poured, as a fine stream, into a large volume of water which was vigorously agitated. A white, finely-divided crystalline solid was obtained. This was filtered off, washed with water and dried. The crystals had a melting point of 212-213° C. and were identified as being 2,5-ditertiary butyl hydroquinone. The yield was 85-90 per cent of the calculated theoretical.

*Example 2.—Monotertiary butyl hydroquinone* —To 110 grams (1 mole) of hydroquinone dissolved in 360 grams (4.9 moles) of tertiary butyl alcohol, there was added 230 grams (1.70 moles) of anhydrous zinc chloride. The mixture was stirred until all the zinc chloride had dissolved, heated in the steam bath for one hour and then poured with stirring into a large volume of cold water. A powdery precipitate formed which was filtered off and dried. The product was a white crystalline solid having a melting point of 149°-150° C., and was identified as being monotertiary butyl hydroquinone. None of the ditertiary butyl hydroquinone was formed.

What we claim as our invention and desire to be secured by Letters Patent of the United States is:

1. Process for the production of 2,5-ditertiary butyl hydroquinone comprising heating hydroquinone with tertiary butyl alcohol, in the presence of at least 1.75 moles of anhydrous zinc chloride per mole of hydroquinone.

2. Process for the production of 2,5-ditertiary butyl hydroquinone comprising heating hydroquinone with tertiary butyl alcohol, in the presence of from 1.75 to 5 moles of anhydrous zinc chloride per mole of hydroquinone.

3. Process for the production of 2,5-ditertiary butyl hydroquinone comprising heating a mixture of 1 mole of hydroquinone, 5 moles of tertiary butyl alcohol and 2 moles of anhydrous zinc chloride.

FREDERIC R. BEAN.
THOMAS S. DONOVAN.

REFERENCES CITED

The following references are of record in the file of this patent:

UNITED STATES PATENTS

| Number | Name | Date |
| --- | --- | --- |
| 252,782 | Liebman | Jan. 24, 1882 |
| 2,107,307 | Rawlins et al. | Feb. 8, 1938 |
| 2,146,007 | Bousquet | Feb. 7, 1939 |
| 2,439,421 | Erickson | Apr. 13, 1948 |

OTHER REFERENCES

Thomas, Anhydrous Aluminum Chloride In Organic Chemistry, pub. by Reinhold Publishing Corp., N. Y. (1941), page 870.

Oesper et al., Jour. Am. Chem. Soc., vol. 64, 937 (1942).